(12) United States Patent
Sheffield et al.

(10) Patent No.: US 10,167,995 B2
(45) Date of Patent: Jan. 1, 2019

(54) PORTABLE ITEM HOLDER HAVING AN ELONGATE VOID EXTENDING BETWEEN TWO OPENINGS FOR RECEIVING THE ITEM

(71) Applicant: We-Flex, LLC, Town & Country, MO (US)

(72) Inventors: Douglas M. Sheffield, Chesterfield, MO (US); Tamara K. Sheffield, Chesterfield, MO (US)

( * ) Notice: Subject to any disclaimer, the term of this patent is extended or adjusted under 35 U.S.C. 154(b) by 751 days.

(21) Appl. No.: 13/675,165

(22) Filed: Nov. 13, 2012

(65) Prior Publication Data

US 2013/0119214 A1 May 16, 2013

Related U.S. Application Data

(60) Continuation of application No. 11/945,082, filed on Nov. 26, 2007, now Pat. No. 8,308,118, which is a division of application No. 11/491,580, filed on Jul. 24, 2006, now abandoned.

(51) Int. Cl.
*F16M 13/02* (2006.01)
*A44B 15/00* (2006.01)
*F16B 47/00* (2006.01)

(52) U.S. Cl.
CPC ........... *F16M 13/02* (2013.01); *A44B 15/005* (2013.01); *F16B 47/00* (2013.01); *Y10T 24/1379* (2015.01)

(58) Field of Classification Search
CPC ........... F16M 13/02; F16B 47/00; A47G 1/17
USPC ... 248/206.2, 205.5, 205.6, 309.3, 363, 683, 248/467; 40/597
See application file for complete search history.

(56) References Cited

U.S. PATENT DOCUMENTS

| | | | | |
|---|---|---|---|---|
| 1,835,294 | A * | 12/1931 | Gilham | B60R 11/00 248/115 |
| 2,045,672 | A * | 6/1936 | Oliveri | F16B 47/00 116/DIG. 24 |
| 3,126,603 | A * | 3/1964 | Cedarstaff | 24/599.4 |
| 4,976,172 | A * | 12/1990 | Thomas et al. | 81/3.09 |
| 6,136,392 | A * | 10/2000 | Sheffield et al. | 428/34.1 |

(Continued)

OTHER PUBLICATIONS http://flingprom.com, SUX, Apr. 6, 2003, Apr. 4, 2004 (as archived on http://webasrchisve.org).*

*Primary Examiner* — Kimberly T Wood
(74) *Attorney, Agent, or Firm* — Tiffany N. Logan; Parks IP Law LLC (57) ABSTRACT

An item holder, mountable by suction on a mounting surface, including a deformable body having a convex outer surface that is substantially free of protrusions, a concave inner surface, and an edge extending around the outer and the inner surfaces. The deformable body is shaped to form in the body an elongate void extending through the deformable body, between the concave inner surface and the convex outer surface, in a direction that is generally parallel to the mounting surface during use of the holder. The elongate void formed by the deformable body terminates at opposing openings including of a first opening opposite a second opening. The body also defines a suction portion needed for creating the suction between the body and the mounting surface. The holder also includes a link component extending into the first opening, through the elongate void, and out of the second opening.

19 Claims, 7 Drawing Sheets

(56) References Cited

U.S. PATENT DOCUMENTS 6,143,391 A * 11/2000 Barnes .................... F16B 47/00
                                              248/205.8

* cited by examiner

PORTABLE ITEM HOLDER HAVING AN ELONGATE VOID EXTENDING BETWEEN TWO OPENINGS FOR RECEIVING THE ITEM

BACKGROUND OF THE INVENTION

The present invention relates to item holders and, more particularly, to portable item holders that vacuum mount to surfaces.

Many conventional item holders, such as conventional key chains, include rings or cords that hold items. A user can temporarily store the holder on a wall by hanging the ring or cord on a hook extending from the wall. The hook may be mounted directly to the wall or mounted on a magnet or suction cup that can be removably attached to a corresponding surface. Other conventional item holders, such as most pictures frames, are designed to display an item on a wall. Such displaying holders must also be hung from a hook extending from the wall. Conventional item holders have many drawbacks.

One drawback of conventional item holders is that they cannot be stored on vertical surfaces unless they are hung on a hook extending from the vertical surface. The hook-and-magnet or suction-cup devices described above are helpful but have limited convenience. For example, a hook-and-magnet device requires a ferrous surface. Thus, the device will not work where the surface is not ferrous. Whatever types of hooks are used, they need to be positioned in every location a user wants to store the key chain. Further, because the hooks required for hanging conventional item holders on a vertical surface are not part of the holders, the holders cannot be stored in many desired locations away from the usual mounting places unless the user takes the hook or hook-having device with them. For example, people cannot mount their key chain to a hotel room mirror unless they have their hook-supporting device with them.

Further, changing a storing or displaying location of conventional item holders requiring hooks fixed to walls for hanging is often cumbersome. For example, nails or other types of hooks often need to be removed from walls when a user wants to rearrange their interior decoration. Removing hooks from walls results in holes and/or scars on the walls, which usually need to be repaired by filling and painting.

BRIEF SUMMARY OF THE INVENTION

The present invention relates to an item holder mountable by suction on a generally smooth mounting surface including a deformable body. The deformable body includes an outer surface and an inner surface having a concave portion opposite the outer surface. The deformable body further includes a periphery extending around the body and surrounding the outer surface and inner surface. The deformable body also includes a hole extending through the body between the outer surface and inner surface for holding an item during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In another aspect, the present invention relates to an item holder mountable by suction on a generally smooth mounting surface including a deformable body. The deformable body includes an outer surface that is substantially free of protrusions and an inner surface having a concave portion opposite the outer surface. The deformable body further includes a periphery extending around the body and surrounding the outer surface and inner surface. The item holder further includes an appendage extending from a base adjacent the periphery to a tip opposite the base. The appendage has a hole therein for holding an item during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In yet another aspect, the present invention relates to an item holder mountable by suction on a generally smooth mounting surface including a deformable body. The deformable body includes an outer surface and an inner surface having a concave portion opposite the outer surface. The deformable body further includes a periphery extending around the body and surrounding the inner surface and outer surface. The item holder further includes an appendage extending from a base adjacent the periphery to a tip opposite the base. The item holder also includes a connector attached to the appendage for connecting the appendage adjacent the tip to a position on the holder adjacent the base to form a loop for holding an item during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In still another aspect, the present invention relates to an item holder mountable by suction on a generally smooth mounting surface including a deformable body. The deformable body includes an outer surface having a convex portion that is substantially free of protrusions and an inner surface having a concave portion opposite the convex portion. The deformable body further includes a periphery extending around the body and surrounding the inner surface and outer surface. The item holder further includes a fastener attached to the outer surface of the body for attaching an item to the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In still yet another aspect, the present invention relates to an item holder mountable by suction on a generally smooth mounting surface including a deformable body. The deformable body includes an outer surface and an inner surface having a concave portion opposite the outer surface. The deformable body further includes a periphery extending around the body and surrounding the inner surface and outer surface. The item holder further includes an appendage extending from a base connected to the periphery to a tip opposite the base. The item holder also includes a base attached to the appendage for attaching an item to the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In another aspect, the present invention relates to an item holder mountable by suction on a generally smooth mounting surface including a deformable body. The deformable body includes an outer surface that is substantially free of protrusions and an inner surface having a concave portion opposite the outer surface. The deformable body further includes an edge extending around the body and a hole extending through the deformable body in a direction that is generally parallel to the mounting surface during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to its actuated shape thereby sealing the body against the mounting surface and forcing fluid out of the cavity to create a suction between the body and the mounting surface thereby securing the body to the mounting surface.

In yet another aspect, the present invention relates to an item holder mountable by suction on a generally smooth mounting surface. The holder includes a deformable body including an outer surface and an inner surface having a concave portion opposite the outer surface. The deformable body further includes an edge extending around the body and a protrusion extending from the body. The protrusion has a hole extending through the protrusion in a direction that is generally parallel to the mounting surface during use of the holder. The body is deformable from an undeformed shape to an actuated shape to mount the holder on the mounting surface by positioning the inner surface of the body adjacent the mounting surface when the body is in its undeformed shape thereby forming a cavity between the body and the mounting surface and deforming the body to Us actuated shape thereby sealing the body against the mounting surface and forcing fluid out of the cavity to create a suction between the body and the mounting surface thereby securing the body to the mounting surface.

In still another aspect, the present invention relates to a method of using an item holder including a deformable body having an outer surface, an inner surface having a concave portion opposite the outer surface, a periphery extending around the body and surrounding the inner surface and outer surface, and a hole extending through the body between the outer surface to the inner surface. The method includes connecting an item to the holder so that the item at least partially fills the hole. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes demounting the body from the mounting surface by moving the body out of its actuated shape thereby breaking the seal and suction. Moreover, the method includes using the item after the demounting step and without repositioning the inner surface of the body adjacent the mounting surface or moving the body to its actuated shape before using the item.

In still yet another aspect, the present invention relates to a method of using an item holder including a deformable body having an outer surface, an inner surface having a concave portion opposite the outer surface, and a periphery extending around the body and surrounding the inner surface and outer surface, and an appendage extending from the body having a hole therein. The method includes connecting an item to the holder so that the item at least partially fills the hole. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes demounting the body from the mounting surface by moving the body out of its actuated shape thereby breaking the seal and suction. Moreover, the method includes using the item after the demounting step and without repositioning the inner surface of the body adjacent the mounting surface or moving the body to its actuated shape before using the item.

In another aspect, the present invention relates to a method of using an item holder including a deformable body having an outer surface, an inner surface having a concave portion opposite the outer surface, and a periphery extending around the body and surrounding the inner surface and outer surface, an appendage extending from a base adjacent the periphery to a tip opposite the base, and a connector attached to the appendage for connecting the appendage adjacent the tip to a position on the holder adjacent the base to form a loop. The method includes connecting an item to the loop and positioning the inner surface of the body adjacent the mounting surface while the body is in an undeformed shape thereby forming a cavity between the body and the mounting surface. The method further includes moving the body to an actuated shape thereby sealing the body against the mounting surface and forcing fluid out of the cavity to create a suction between the body and the mounting surface thereby securing the body to the mounting surface. The method also includes demounting the body from the mounting surface by moving the body out of its actuated shape thereby breaking the seal and suction. In addition, the method includes using the item after the demounting step and without repositioning the inner surface of the body adjacent the mounting surface or moving the body to its actuated shape before using the item.

In yet another aspect, the present invention relates to a method of using an item holder including a deformable body having an outer surface, an inner surface having a concave portion opposite the outer surface and a periphery extending around the body and surrounding the inner surface and outer surface. The body further has a hole extending through the body in a direction that is generally parallel to a mounting surface during use of the holder. The method includes connecting an item to the holder so that the item at least partially fills the hole. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes demounting the body from the mounting surface by moving the body out of its actuated shape thereby breaking the seal and suction. Moreover, the method includes using the item after the demounting step and without repositioning the inner surface of the body adjacent the mounting surface or moving the body to its actuated shape before using the item.

In still another aspect, the present invention relates to a method of using an item holder including a deformable body having an outer surface, an inner surface having a concave portion opposite the outer surface, and a periphery extending around the body and surrounding the inner surface and outer surface. The holder further includes a protrusion extending from the body having a hole extending through the protrusion in a direction that is generally parallel to a mounting surface during use of the holder. The method includes connecting an item to the holder so that the item at least partially fills the hole. The method further includes positioning the inner surface of the body adjacent the mounting surface while the body is in an undeformed shape thereby forming a cavity between the body and the mounting surface. The method also includes moving the body to an actuated shape thereby sealing the body against the mounting surface and forcing fluid out of the cavity to create a suction between the body and the mounting surface thereby securing the body to the mounting surface. In addition, the method includes demounting the body from the mounting surface by moving the body out of its actuated shape thereby breaking the seal and suction. Moreover, the method includes using the item after the demounting step and without repositioning the inner surface of the body adjacent the mounting surface or moving the body to its actuated shape before using the item.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
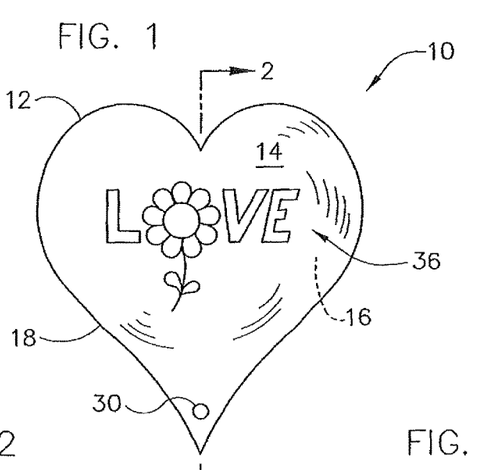
FIG. 1 is a top plan of an item holder according to a first embodiment of the present invention.
Figure 2:
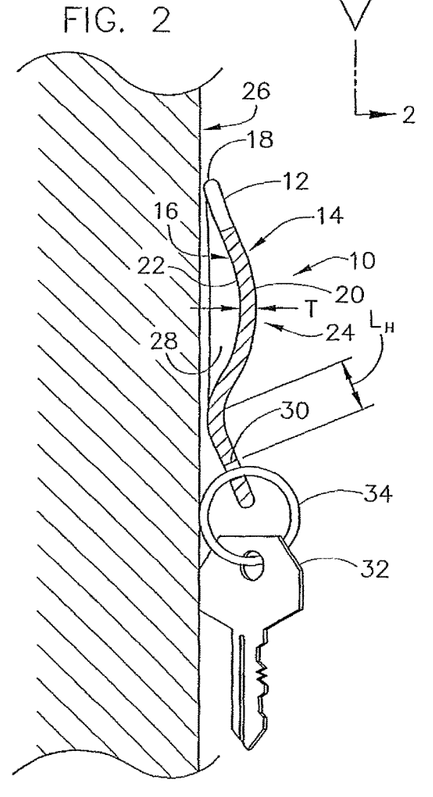
FIG. 2 is a cross section of the item holder taken along line 2-2 of FIG. 1 shown in an undeformed shape adjacent a mounting surface.

Referring to the figures, and more particularly to FIG. 1, a portable item holder according to a first embodiment of the present invention is designated in its entirety by reference number 10. The item holder 10 has a flexible or deformable body 12 including an outer surface 14, an inner surface 16, and a periphery 18 extending around the body and surrounding the inner surface and the outer surface. The flexible body 12 does not include appendages extending from the periphery 18. For example, the flexible body 12 does not include release taps commonly extending from peripheries of conventional suction cups. Although the flexible body 12 may include other materials without departing from the scope of the present invention, in one embodiment the body includes a resinous thermoplastic such as polyvinyl chloride. As shown in FIG. 2, the outer surface 14 may include a convex portion 20. The inner surface 16 includes a concave portion 22 opposite the outer surface 14. For embodiments in which the outer surface 14 includes the convex portion 20, the concave portion 22 of the inner surface 16 may be opposite the convex portion. The outer surface 14 may be substantially free of protrusions such as the central knobs protruding from outer surfaces of conventional suction cups. In one embodiment, the convex portion 20 is substantially free of 15 protrusions. The flexible body has a thickness T measured between the outer surface 14 and the inner surface 16. The thickness T may vary throughout the flexible body 12 or be generally constant. For example, the thickness T may vary from a maximum thickness of between about 0.25 inch and about 0.1 inch in a central region 24 of the convex and/or concave portions 20, 22 and a minimum thickness of between about 0.08 inch and about 0.04 inch adjacent the periphery 18. In one embodiment, the flexible body 12 has a constant thickness T of between about 0.13 inch and about 0.08 inch.

Figure 3:
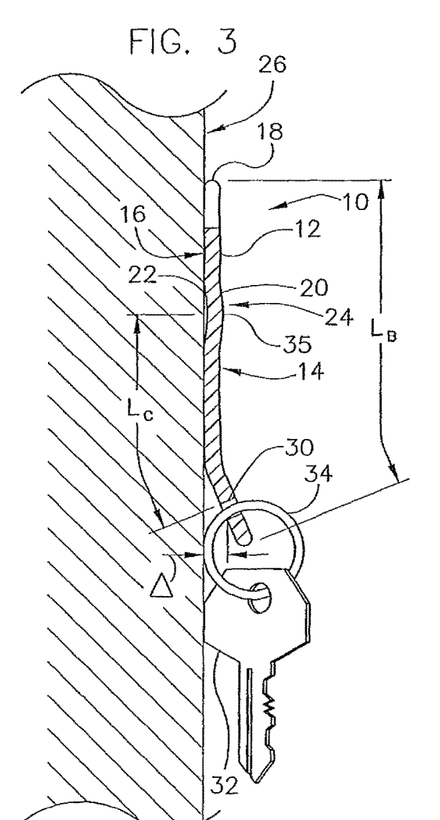
FIG. 3 is a cross section of the item holder of FIG. 2 shown in an actuated shape secured to the mounting surface.

The flexible body 12 is deformable between an undeformed or default shape, shown in FIG. 2, and an actuated shape, shown in FIG. 3, to mount the holder 10 by suction or vacuum on a generally smooth and generally non-porous mounting surface 26. The holder 10 may be secured to mounting surfaces 26 having various attitudes. For example, the holder 10 may be mounted on an upward facing or downward facing horizontal mounting surface 26. The holder 10 may also be mounted on a vertical surface 26 or on a generally upward or downward facing surface that is angled between horizontal and vertical. Mountability of the holder 10 on a downward facing surface may be limited when the holder is holding heavy and/or bulky items with respect to the size of the flexible body 12. A mounting strength of the holder 10 depends in part on the size, shape, and material of the body 12 and characteristics of the mounting surface 26, such as smoothness and porosity.

The mounting surface 26 must include a surface area that is at least as large as an area the flexible body 12 spans when it is in its actuated shape. To mount the holder 10 on the mounting surface 26, the inner surface 16 of the flexible body 12 is positioned adjacent the mounting surface when the body is in its default shape, as shown in FIG. 2. By positioning the flexible body 12 in this way, a cavity 28 is formed between the body 12 and the mounting surface 26. Then the flexible body 12 is moved to its actuated shape (i.e., causing the inner surface 16 to conform to the mounting surface), as shown in FIG. 3, thereby sealing the body against the mounting surface 26 and forcing fluid such as air out of the cavity 28 to create the suction between the body and the mounting surface. The suction created within the sealed cavity secures the body 12 to the mounting surface 26. As the flexible body 12 is deformed toward the actuated shape, reflex or spring forces are created in the body between the convex and concave portions 20, 22 that act to return the body to its default shape. As will be appreciated by those skilled in the art, the flexible body 12 must be sized and shaped so forces created by the suction balance with or are greater than the sum of the reflex forces created in the body and any loading on the body to create and maintain the connection between the body and mounting surface 26.

The periphery 18 of the flexible body 12 may have various sizes and shapes without departing from the scope of the present invention, as long as the suction between the holder 10 and the mounting surface 26 can be created and maintained as described above. For some periphery 18 shapes, the reflex forces in the body 12 must be reduced in places to ensure secure mounting of the holder 10 on the mounting surface 26. One way to reduce reflex forces is by selectively changing body 12 thickness T. For example, the thickness T of the flexible body 12 may taper from a maximum thickness adjacent the central region 24 of the convex and concave portions 20, 22 to a minimum thickness adjacent the periphery 18, as described above, to reduce reflex forces.

It is contemplated that reflex forces can also be reduced by varying the material or material properties of the flexible body 12 between the central region 24 and the periphery 18.

FIG. 1 shows an embodiment of the holder 10 in which the periphery 18 is shaped as a cardiod. The periphery 18 may be symmetric, such as circular, square, or oval, or non-symmetric. In one embodiment, the periphery 18 is non-circular. Other exemplary periphery 18 shapes include those corresponding to articles of clothing such as a shirt or shoe, structures such as a house, a vehicle such as a car, boat, or airplane, and articles of natures such as a fruit, flower, tree, person, or animal. Also, the body 12 may be colored as desired. For example, the cardiod-shaped holder 10 shown in FIG. 1 may be red and a tree-shaped holder (not shown) may be green and/or brown.

The flexible body 12 includes a hole 30 extending through the body from the outer surface 14 to the inner surface 16 for holding an item 32 (shown in FIG. 2) during use of the holder 10. The holder 10 may include a link 34 extending through the hole 30 for attaching the item 32 to the holder 10 or the item may be connected directly to the flexible body 12 through the hole during use of the holder. In one embodiment, the item 32 includes the link 34 for connecting it to the body 12 through the hole 30 and in another embodiment both the item and the holder 10 include links for connecting the item and holder together during use of the holder.

The holder 10 may include various types of links 34 without departing from the scope of the present invention. In one embodiment, the link 34 includes a ring, such as a conventional key ring, as shown in FIGS. 2 and 3. The link 34 may be sized and shaped in various ways without departing from the scope of the present invention. For example, a ring link 34 may have a diameter of between about 0.18 inch and about 1.5 inches.

In another embodiment (not shown), the link 34 includes a flexible member, such as a linked chain, a nylon, plastic, or metal cord, or a flexible strap, connected to the body 12 through the hole 30 for holding the item 32 during use of the holder 10. The holder 10 may be used to hold a variety of items 32 without departing from the scope of the present invention. For example, FIGS. 2 and 3 show the holder 10 holding a key. Other exemplary items 32 include flashlights, cards such as a credit or identification cards, pagers, picture frames, charms, calendars, and clips such as those that can be releasably connected to a belt loop (not shown).

As will be appreciated by those skilled in the art, the hole 30 must be formed in a portion of the flexible body 12 that is not needed for maintaining the suction that secures the item holder 10 to the mounting surface 26 during use of the holder. This material, which is not needed for suction, is referred to as an extra portion of the flexible body 12 herein. If the extra portion is too short relative to the item 32 and/or link 34, the item and link will interfere with mounting the holder 10 on the mounting surface 26 or may undesirably demount the holder after it had been secured to the mounting surface by pushing the holder away from it. The size of the extra portion and hole 30 location can be measured in various ways. For example, one characteristic that may be considered is a maximum clearance Δ (shown in FIG. 2) between the hole 30 and the mounting surface 26 while the holder 10 is secured to the mounting surface. In an embodiment in which the body 12 has a maximum length $L_B$ (shown in FIG. 3) of between about 2.1 inches and about 2.8 inches, the body is configured so that the maximum clearance Δ is between about 0.25 inch and about 0.44 inch. As will be apparent to those skilled in the art, larger and smaller flexible bodies 12 of the same shape generally have maximum clearances Δ that are larger and smaller, respectively. A larger maximum clearance Δ may be required for holding bulkier items 32 and/or links 34. However, for some embodiments of the holder 10 including or used in combination with certain items 32 and/or links 34, the holder can hold very bulky items with little or no increase in required maximum clearance Δ.

Hole 30 location may also be characterized with respect to distances between the hole and other portions of the body 12. For example, a designer of the holder 10 may consider a length $L_H$ (shown in FIG. 2) extending between the hole 30 and the cavity 28 (or "hole-to-cavity length") formed during mounting of the device 10 on the mounting surface 26 before deformation of the body for mounting. In one embodiment, the body 12 is configured so that the hole-to-cavity length $L_H$ is between about 0.25 inch and about 1.25 inches. A designer of the holder 10 may also consider the maximum length of the body $L_B$ and a length $L_C$ between a center 35 of the central region 24 and the hole 30 (or "center-to-hole length"). Although the flexible body 12 may have other maximum lengths $L_B$ without departing from the scope of the present invention, in one embodiment the flexible body has a maximum length of between about 2 inches and about 3 inches. Although the flexible body 12 may have other center-to-hole lengths $L_C$ without departing from the scope of the present invention, in one embodiment the body has a center-to-hole length of between about 0.5 inch and about 1.5 inches. Additional variables that may be considered during holder 10 design are the size and shape of the link 34 and/or item 32. As described above, the holder 10 may include or be used in combination with links 34 and/or items 32 of various sizes and shapes.

Through experimentation and calculation, a designer of the holder 10 may identify relationships amongst characteristics of the holder including the maximum clearance $\Delta$, the size and shape of the link 34, the maximum body length $L_B$, the hole-to-cavity length $L_H$, and the center-to-hole length $L_C$. For example, a designer may identify relationships between the maximum body length $L_B$, the size of the link 34, and the center-to-hole length $L_C$. For a holder 10 according to one particular embodiment including a body 12 made of polyvinyl chloride having a maximum length $L_B$ of about 2.75 inches and including or used in combination with a ring-shaped link 34 having a diameter of between about 0.25 inch and about 1.5 inches, one preferred center-to-hole length $L_C$ is about 1.125 inches. For a holder 10 according to another particular embodiment including a body 12 made of polyvinyl chloride and having a maximum length $L_B$ of about 2.75 inches, but including or used in combination with a smaller link 34, such as a link having a size similar to a size of a conventional safety pin (e.g., having a maximum width of between about 0.0625 inch and about 0.25 inch), one preferred center-to-hole length $L_C$ is about 0.75 inch. As another example, for a holder 10 according to a particular embodiment including a body 12 (e.g., a body having a periphery shaped as an apple) made of polyvinyl chloride having a maximum length $L_B$ of about 2.125 inches and including or used in combination with a ring-shaped link 34 having a diameter of between about 0.25 inch and about 1.5 inches, one preferred center-to-hole length $L_C$ is about 0.875 inch. For a holder 10 according to yet another particular embodiment including a body 12 made of polyvinyl chloride, having a maximum length $L_H$ of about 2.75 inches, and including or used in combination with a link 34 having a size similar to the size of a conventional safety pin, one preferred center-to-hole length $L_C$ is about 0.75 inch.

A designer may also identify specific exemplary relationships between the center-to-hole length $L_C$, the size of the link 34, and the maximum clearance $\Delta$. A holder 10 according to a particular embodiment including a body 12 made of polyvinyl chloride having a center-to-hole length $L_C$ of between about 1 inch and about 1.125 inches and including or used in combination with a ring-shaped link 34 having a diameter of about 1.125 inches has a maximum clearance $\Delta$ of between about 0.3125 inch and about 0.4375 inch. According to another particular embodiment, a holder 10 including a body 12 made of polyvinyl chloride and having a center-to-hole length $L_C$ of between about 1 inch and about 1.125 inches, but including or used in combination with a link 34 having a size similar to the size of a conventional safety pin, also has a maximum clearance $\Delta$, of between about 0.3125 inch and about 0.4375 inch.

As shown in FIG. 1, the holder 10 may include a message 36 displayed on the outer surface 14 of the flexible body 12, on the inner surface 16 of the body, and/or between them. Various types of messages 36 may be displayed on or in the flexible body 12 for various reasons without departing from the scope of the present invention. For example, words, logos, and/or art may be displayed on or in the flexible body 12 for aesthetic and/or communication purposes. The message 36 may be secured to or formed in the body 12 in various ways without departing from the scope of the present invention. For example, the message 36 may be printed on the outer surface 14 or inner surface 16 of the body 12. The message 36 may also be printed on a label adhered to the outer surface 14 and the label may be fully or partially opaque, translucent, and/or transparent as desired. It is contemplated that the message 36 may be formed using material of the flexible body 12 by, for example, molding, melting, etching or engraving the message into the outer surface 14 of the body. The message 36 may be colored as desired and, as described above, the flexible body 12 may be colored as desired. The shape of the body 12, the color of the body, the message 36, and the color of the message may be selected to relate to each another as desired. For example, in one embodiment (not shown), a golf ball inspired holder has a generally circular periphery, a message including actual dimples or a rendition of dimples printed or otherwise displayed on the outer surface of the body, and a white body.

The item holder 10 may be used in various ways without departing from the scope of the present invention. To use the holder 10, a user connects the item 32 to the holder by way of the hole 30 in the flexible body 12 and mounts the holder on a generally smooth and generally non-porous mounting surface 26. As described above, the item 32 may be connected to the flexible body 12 directly by way of the hole 30 or connected to the body by way of one or more links 34. Exemplary uses of the holder 10 include storing and/or displaying items 32 on a home refrigerator or mirror between uses of the items. The user can also store and/or display items 32 on a smooth surface 26 at work or elsewhere between uses of the item. A benefit of the present invention is flexibility to relocate the holder 10 on generally any smooth and non-porous mounting surface 26 as desired. For this reason, the holder 10 is said to be portable.

The holder 10 may be used to hold an item 32 usable after the holder is removed from the mounting surface 26. For example, the holder 10 can be used to hold a key, as shown in FIGS. 2 and 3, which may be used to open a lock after the holder is demounted from the mounting surface 26. The holder 10 may also hold an item 32 that is used for reasons other than display while the holder is secured to the mounting surface 26. For example, the holder 10 may hold a writing pen (not shown) attached to the flexible body 12 of the holder by a type of link 34 that is long enough to allow use of the pen on a nearby writing surface while the holder is secured to the mounting surface 26.

As describe above, securing the holder 10 to the mounting surface 26 includes positioning the inner surface 16 of the flexible body 12 adjacent the mounting surface while the body is in its default shape thereby forming the cavity 28 between the body and the mounting surface. Then, the flexible body 12 is moved to its actuated shape thereby sealing the body against the mounting surface 26 and forcing fluid such as air out of the cavity 28 to create a suction between the flexible body and the mounting surface. Sealing the suction between the flexible body 12 and the mounting surface 26 secures the body to the mounting surface. To demount the flexible body 12 from the mounting surface 26, for example to relocate the holder 10 on another smooth mounting surface or for using the item before remounting the holder, the body is moved out of its actuated shape thereby breaking the seal and suction. To break the seal and move the body 12 out of its actuated shape, the user may move or pull on a portion of the periphery 18, on the item 32, or on the link 34. The item 32 may be used for its intended purpose while the item is secured to the mounting surface 26 by the holder 10 or after the holder has been demounted and before the holder has been remounted to the mounting surface by repositioning the inner surface 16 of the flexible body 12 adjacent a mounting surface and moving the body to its actuated shape. To hold heavier and/or more bulky items 32, the holder 10 may need to be mounted on the surface 26 with the extra portion having the hole 30 oriented generally downward to avoid having a weight of the items pull on the periphery 18 too much to undesirably disengage or preclude mounting of the holder. For lighter and less bulky items, the holder 10 may be mounted with the extra portion having the hole 30 oriented in any direction.

Figure 4:
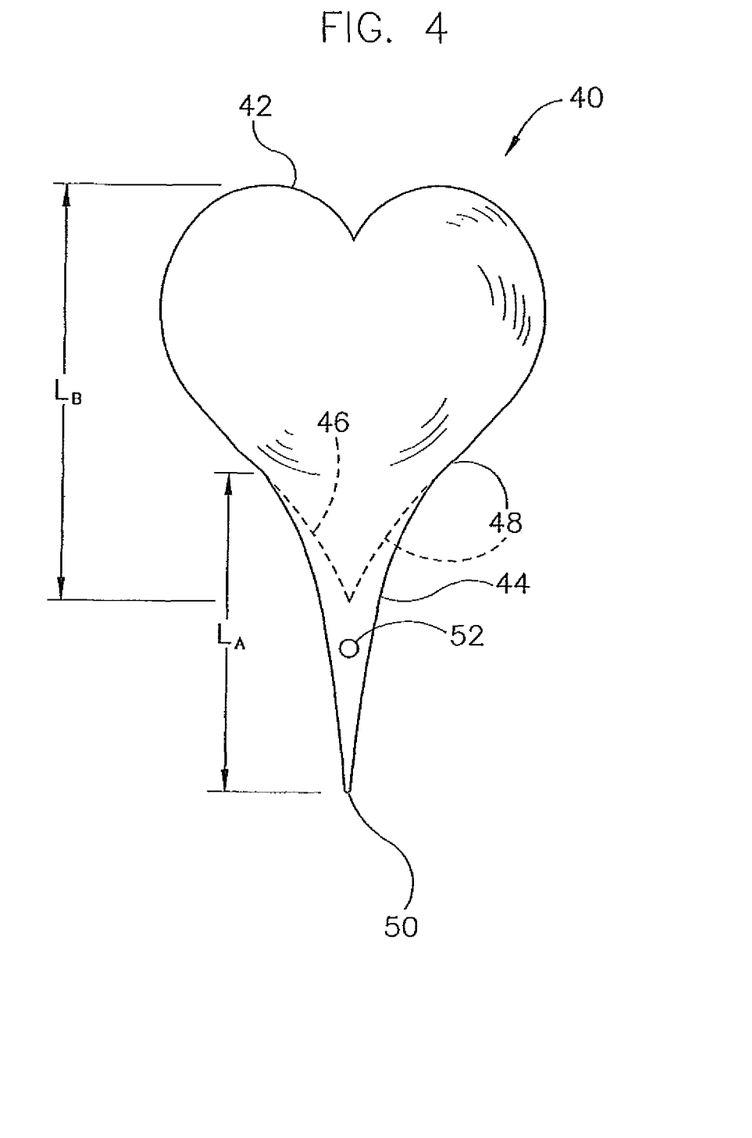
FIG. 4 is a top plan of an item holder according to a second embodiment of the present invention.

FIG. 4 shows an item holder 40 according to another embodiment of the present invention including an appendage 44 extending from a base 46 connected to a periphery 48 of the body to a tip 50 opposite the base. The appendage 44 has a hole 52 therein for holding the item 32 and/or link 34 (shown in FIGS. 2 and 3) during use of the holder 40. The appendage 44 is extra material added to the body for, at least in part, holding the item 32. The appendage 44 may have various sizes and shapes 10 without departing from the scope of the present invention. The appendage 44 should be sized and shaped so the item 32 and/or link 34 attached to the appendage do not interfere with the ability of the holder 40 to maintain suction against the mounting surface 26 (shown in FIGS. 2 and 3). For example, if the appendage 44 is too small relative to the item 32 and/or link 34, the item and/or link will interfere with mounting the holder 40 on the mounting surface 26 or may undesirably demount a mounted holder by pushing the holder away from the mounting surface.

The size of the appendage 44 can be measured in various ways. In one embodiment, the appendage 44 is configured so that the hole 52 can be separated from the mounting surface 26 by a maximum clearance (similar to the maximum clearance Δ shown in FIG. 3) of between about 1 inch and about 3 inches while the holder 40 is secured to the mounting surface. The maximum clearance depends in part on the maximum length of the appendage $L_A$. Although the appendage 44 may have other maximum lengths $L_A$ without departing from the scope of the present invention, in one embodiment the appendage has a maximum length that is between about 10% and about 100% of a maximum length $L_B$ of the body. For example, in a particular embodiment, the appendage 44 has a maximum length $L_A$ of between about 0.2 inch and about 2.5 inches and the body 12 has a maximum length $L_B$ of between about 2 inches and about 2.5 inches, In one embodiment, the appendage 44 has a maximum length $L_A$ that is at least 10% of a maximum length $L_B$ of the body. The maximum clearance of the holder 40 may be generally proportionate to the maximum length $L_A$ of the appendage 44. For example, an appendage having a length LA that is greater than 2.5 inches could have a maximum clearance greater than about 3 inches in some proportion to the increase in appendage length above 2.5 inches. As a particular example, a holder 40 including an appendage 44 having a maximum length $L_A$ of about 5 inches may have a maximum clearance of about 5.5 inches.

Although the appendage 44 may have other masses without departing from the scope of the present invention, in one embodiment the appendage has a mass that is between about 1% and about 22% of a total mass of the body. For example, in a particular embodiment, the appendage 44 has a mass of between about 0.06 gram and about 1.25 grams and the body 12 has a mass of between about 5.9 grams and about 6.25 grams. Further, although the appendage 44 may have other weights without departing from the scope of the present invention, in one embodiment the appendage has a weight that is between about 1.4% and about 23% of a total weight of the body. For example, in a particular embodiment, the appendage 44 has a weight of between about 0.0002 pound and about 0.003 pound and the body 12 has a weight of between about 0.013 pound and about 0.014 pound. In one embodiment, the appendage 44 has a weight that is at least about 1% of the total body weight. Also, although the appendage 44 may have other volumes without departing from the scope of the present invention, in one embodiment the appendage has a volume that is between about 1% and about 21% of a total volume of the body. For example, in a particular embodiment, the appendage 44 has a volume of between about 0.007 cubic inches and about 0.127 cubic inches and the body 12 has a volume of between about 0.621 cubic inches and about 0.748 cubic inches.

Figure 5:
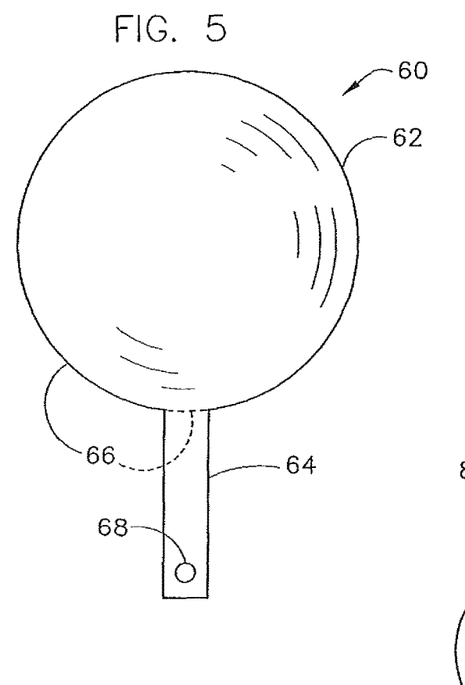
FIG. 5 is a top plan of an item holder according to a third embodiment of the present invention.
Figure 6:
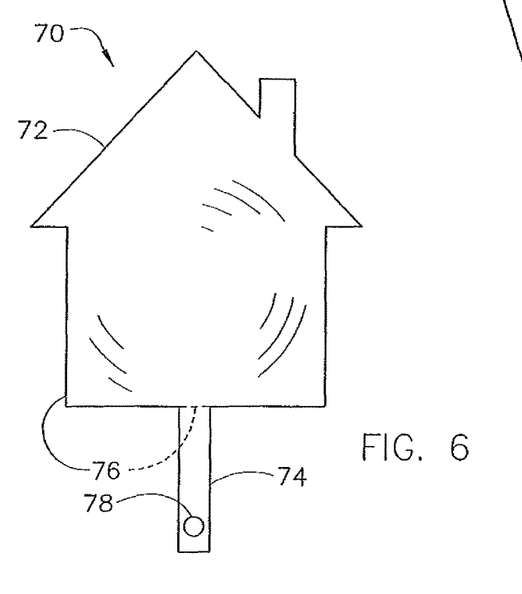
FIG. 6 is a top plan of an item holder according to a fourth embodiment of the present invention.
Figure 7:
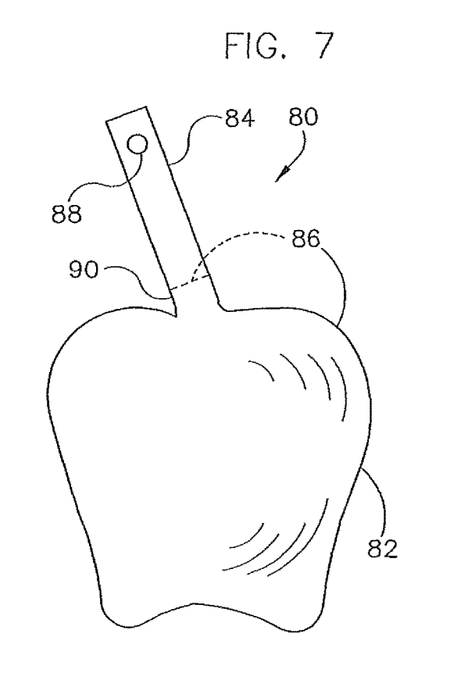
FIG. 7 is a top plan of an item holder according to a fifth embodiment of the present invention.

As with previously described embodiments, the holder 40 according to this embodiment may have various shapes without departing from the scope of the present invention. FIG. 5 shows a holder 60 including a flexible body 62 and an appendage 64. The appendage 64 extends from a generally circular periphery 66 of the body 62 and has a hole 68 for holding the item 32 and/or link 34 (shown in FIGS. 2 and 3). FIG. 6 shows a holder 70 including a body 72 and an appendage 74. The appendage 74 extends from a periphery 76 shaped as a house and includes a hole 78 for holding the item 32 and/or link 34. FIG. 7 shows a holder 80 including a body 82 and an appendage 84. The appendage 84 extends from a periphery 86 shaped as an apple and has a hole 88 for holding the item 32 and/or link 34. Just as the appendage 84 extends from an apple stem portion 90 of the holder 80 in FIG. 7, holders having other shapes may have an appendage extending from an extended portion of those shapes. For example, an appendage may extend from a trunk of an item holder having a periphery shaped as an elephant, from a tail of an item holder having a periphery shaped as an airplane, or from a stem of an item holder having a periphery shaped as a flower (not shown).

The peripheries 76, 86 of the holders 70, 80 shown in FIGS. 6 and 7 outline a general shape of the respective body 72, 82. Thus, the periphery 76 of the house- shaped holder 70 shown in FIG. 6 outlines the sides, bottom, roof, and chimney of the house because they are parts of the house shape. The appendage 74 of this embodiment is formed by material added to the house shape for, at least in part, holding the item 32 during use of the holder 70. Similarly, the periphery 86 of the apple-shaped holder 80 shown in FIG. 7 outlines the apple including a fruit portion and the stem 90 because they are parts of the apple shape. The appendage 84 of this embodiment is added to the apple shape for, at least in part, holding the item 32 during use of the holder 80.

To hold heavier and/or more bulky items 32, the holders 40, 60, 70, 80 according to the second embodiment may need to be mounted with their appendage 44, 64, 74, 84 extending generally downward to avoid having the weight of the items pull on the periphery 48, 66, 76, 86 too much to undesirably disengage or preclude mounting of the holder. For lighter and less bulky items, the holder 40, 60, 70, 80 may be mounted on the mounting surface 26 with their appendage 44, 64, 74, 84 oriented in any direction. The item holders 40, 60, 70, 80 are otherwise identical to the item holder of the first embodiment and therefore will not be described in further detail.

Figure 8:
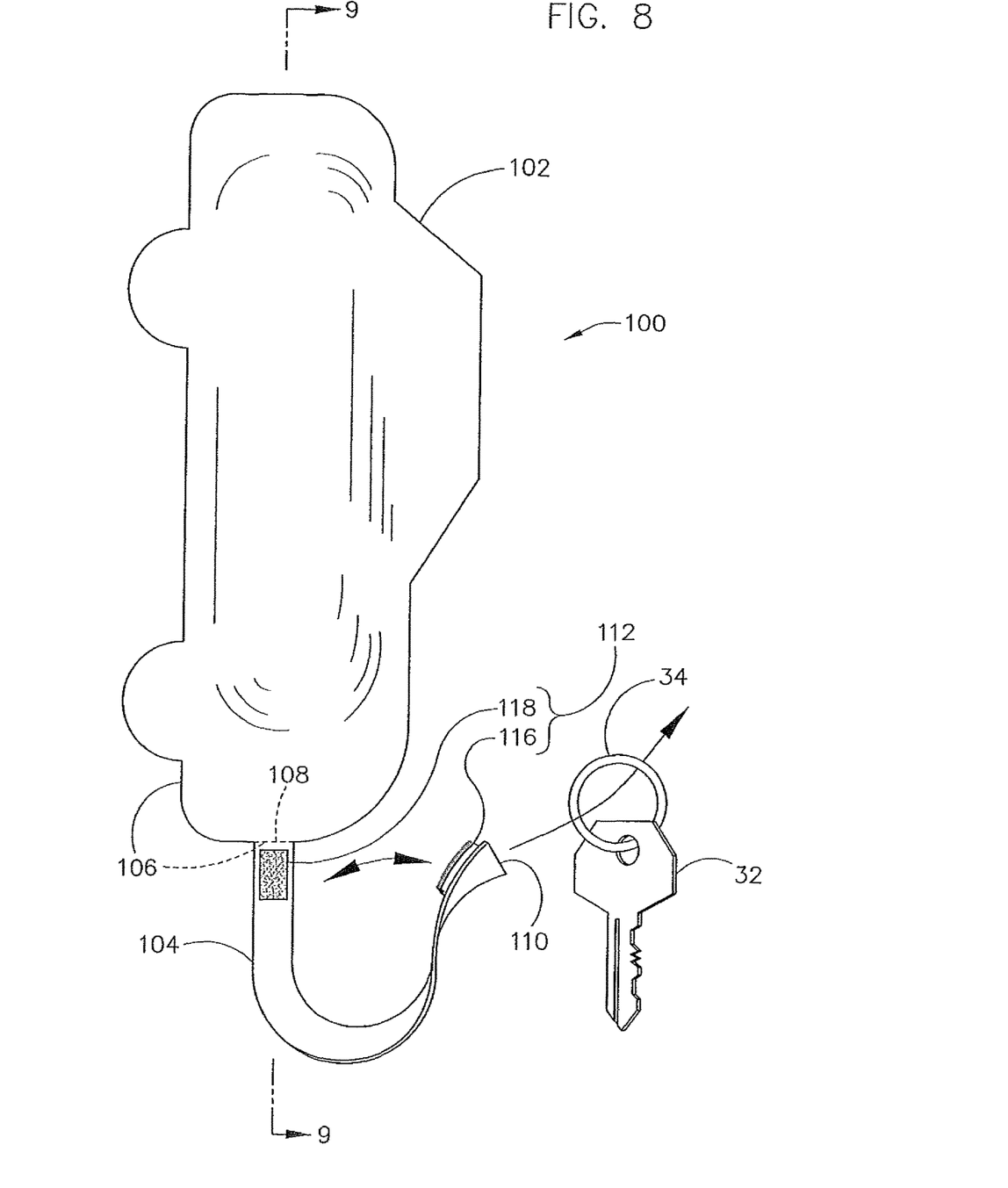
FIG. 8 is a top plan of an item holder according to a sixth embodiment of the present invention.
Figure 9:
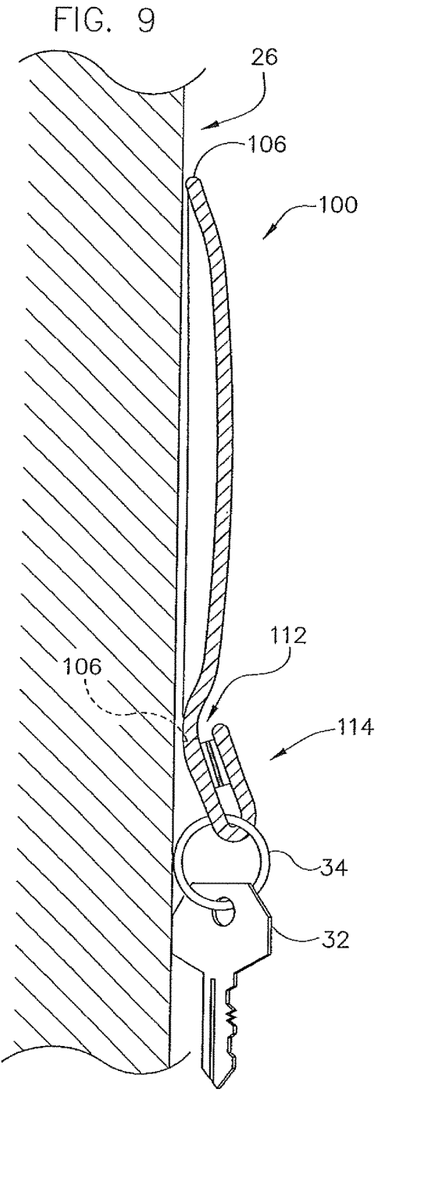
FIG. 9 is a cross section of the item holder taken along line 9-9 of FIG. 8 shown in an undeformed shape adjacent the mounting surface.
Figure 10:
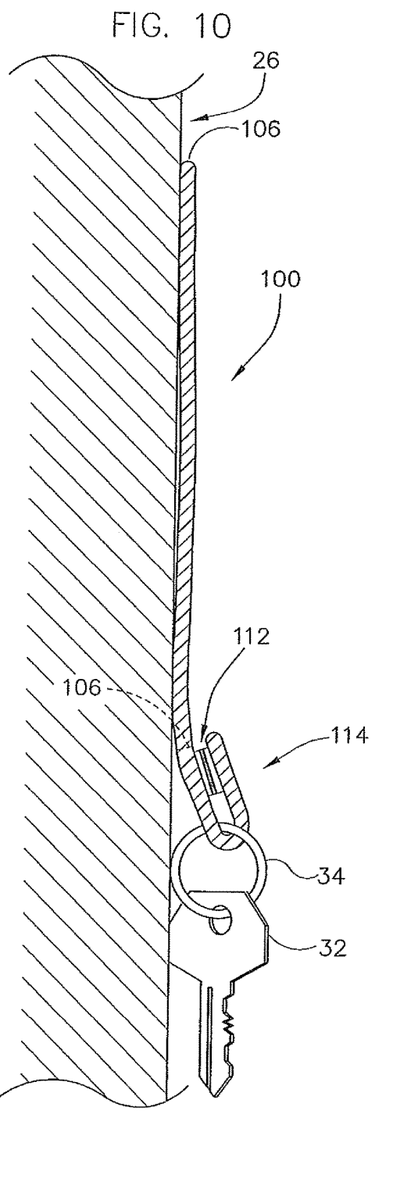
FIG. 10 is a cross section of the item holder of FIG. 9 shown in an actuated shape secured to the mounting surface.

FIG. 8 shows an item holder 100 according to another embodiment of the present invention including a body 102 having a periphery 106 and an appendage 104 extending from a base 108 connected to or adjacent the periphery to a tip 110 opposite the base. The holder 100 further includes a connector 112. As with previous embodiments, the holder 100 according to this embodiment may have various shapes without departing from the scope of the present invention. For example, FIG. 8 shows the periphery 106 shaped as a car. As shown in FIGS. 8-10, the connector 112 can connect the appendage 104 adjacent the tip 110 to the holder 100 adjacent the base 108 of the appendage to form a loop 114 for holding the item 32 during use of the holder 100. The holder 100 may include a link 34 for attaching the item 32 to the loop 114 or the item may be connected directly to the loop. In one embodiment, the item 32 includes a link 34 for connecting the item to the holder 100 through the loop 114 and in another embodiment both the item and the holder include links for connecting the holder and the item together during use of the holder. The holder 100 may include various types of links 34 for holding various items 32, including the links and items described above, without departing from the scope of the present invention.

The holder 100 may include various types of connectors 112 without departing from the scope of the present invention. In some embodiments, the connector 112 removably connects the appendage 104 adjacent the tip 110 to the holder 100 adjacent the base 108 of the appendage. For example, FIGS. 8-10 show an embodiment in which the connector 112 is a hook-and-pile fastener having a first part 116 attached to the appendage 104 adjacent the tip 110 and a second part 118 attached to the appendage 104 adjacent the base 108 of the appendage. Other exemplary releasable connectors (not shown) include an adhesive, a latch, a magnet, and a snap-type fastener. In some embodiments (not shown), the connector 112 non-removably connects the appendage 104 adjacent the tip 110 to the holder 100 adjacent the base 108. For example, in one embodiment the connector 112 is an adhesive or a staple non-removably connecting the appendage 104 adjacent the tip 110 to the appendage 104 adjacent the base 108. As used herein, non-removable does not mean incapable of being removed or 20 separated, but rather means generally fixed and not made for easy and/or repeated removal or separation. In another embodiment, material of the appendage 104 adjacent the tip 110 is molded or welded to material of the holder 100, such as other material of the appendage, adjacent the base 108 to form the connector 112. The item holder 100 of this embodiment is otherwise identical to item holders of earlier described embodiments and therefore will not be described in further detail.

Figure 11:
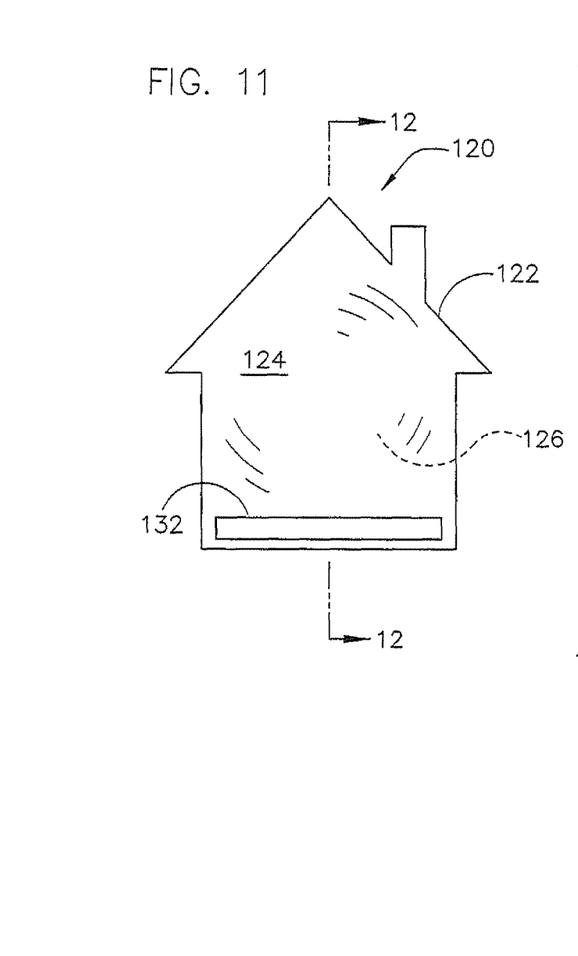
FIG. 11 is a top plan of an item holder according to a seventh embodiment of the present invention.
Figure 12:
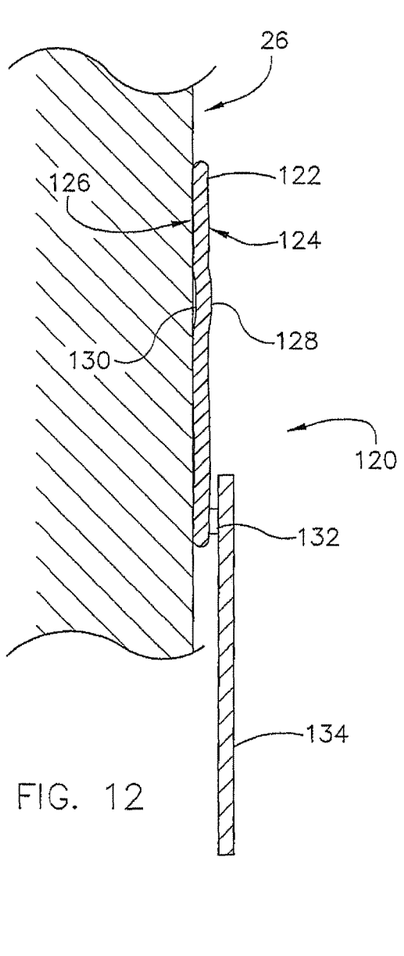
FIG. 12 is cross section of the item holder taken along line 12-12 of FIG. 11 shown in an actuated shape secured to the mounting surface.

FIG. 11 shows an item holder 120 according to yet another embodiment of the present invention including a flexible body 122 having an outer surface 124 and an inner surface 126 opposite the outer surface. As shown in FIG. 12, the outer surface 124 includes a convex portion 128 and the inner surface 126 includes a concave portion 130 opposite the convex portion. The holder 120 further includes a fastener 132 attached to the outer surface 124 of the body 122. As shown in FIG. 12, the fastener 132 is used for attaching an item 134 to the holder 120. The holder 120 may be used to hold various items 134 without departing from the scope of the invention. Exemplary items 134 include a calendar, a photo or photo display frame, art, a pad of paper, and a dry-erase board. When the holder 120 is used to hold items that can be written on, such as a calendar, pad of paper, or dry-erase board, it is contemplated that the holder may also hold a writing instrument, such as a pencil, pen, or dry-erase marker. The writing instrument may be connected to the holder 120, such as by way of a string or cord and a hole (not shown for this embodiment) through the body 122, such as those described above. The writing instrument may also be connected to the holder 120 by way of the item 134, such as by being attached to the pad of paper by way of the string or cord.

Figure 13:
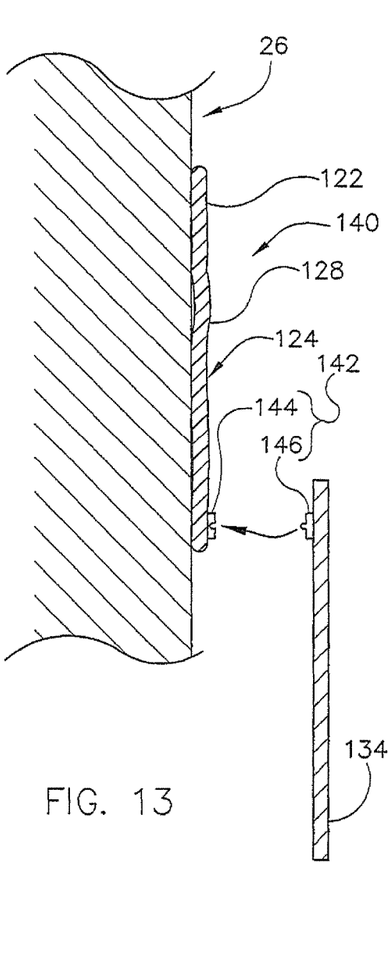
FIG. 13 is a cross section of the item holder according to an eighth embodiment of the present invention having a releasable fastener.

In some embodiments of the item holder 120, the fastener 132 is attached to the outer surface 124 without any part of the fastener being embedded into the flexible body 122. In those embodiments, the holder 120 may be substantially free of material other than material of the body 122 between the outer surface 124 and the inner surface 126. The holder 120 may include a variety of types of fasteners 132 without departing from the scope of the present invention. The fasteners 132 can releasably or non-releasably connect the body 122 to the item 134. For example, FIG. 13 shows an item holder 140 in which the fastener 142 includes a magnetic or snap-type fastener having a first part 144 attached to the flexible body 122 and a second part 146 connectable to the item 134 for releasably securing the item to the body. Other releasable fasteners 142 include an adhesive or hook-and-pile fastener. The fasteners 132, 142 may be connected to the body 122 in various ways including being connected to the body permanently by adhesive or otherwise or releasably by adhesive or otherwise.

The fasteners 132, 142 may be attached to various portions of the outer surface 124 of the body 122. In one embodiment, the fasteners 132, 142 are attached to a portion of the outer surface 124 other than the convex portion 128. In another embodiment, the holder 120, 140 includes an appendage (not shown in detail), such as those described above and shown in FIGS. 4-7, extending from the body 122 and the fastener 132, 142 is attached to the appendage. The item holders 120, 140 of this embodiment are otherwise identical to holders of earlier described embodiments and therefore will not be described in further detail.

Figure 14:
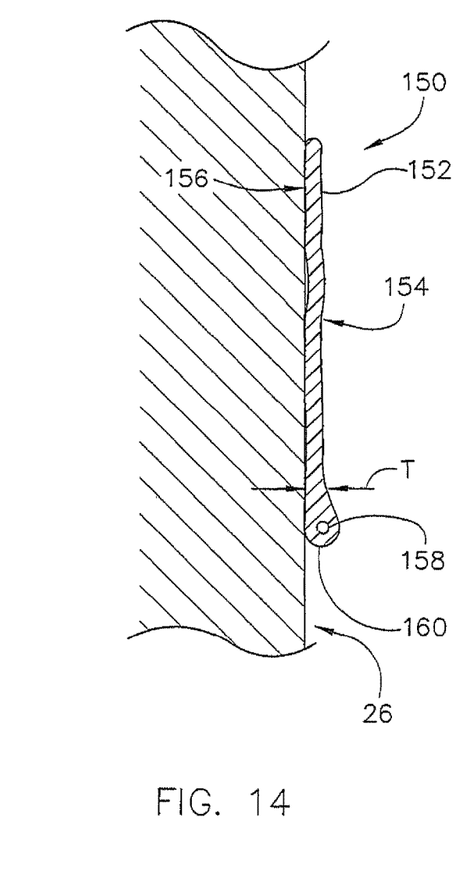
FIG. 14 is a cross section of an item holder according to a ninth embodiment of the present invention shown in an actuated shape secured to the mounting surface.

FIG. 14 shows an item holder 150 according to still another embodiment of the present invention. The holder 150 according to this embodiment includes a flexible body 152 having an outer surface 154 and an inner surface 156 opposite the outer surface. The flexible body 152 includes a hole 158 extending through the body in a lateral direction with respect to the body (i.e., generally parallel to the mounting surface during mounting of the holder 150 on the mounting surface). The hole 158 may be used for holding an item 32 (shown in FIG. 2) during use of the holder 150. The holder 150 may include a link 34 (shown in FIG. 2) extending through the hole 158 for attaching the item 32 to the holder 150 or the item may be connected directly to the flexible body 152 through the hole during use of the holder. In one embodiment, the item 32 includes the link 34 for connecting it to the body 152 through the hole 158 and in another embodiment both the item and the holder 150 include links for connecting the item and holder together during use of the holder. The flexible body 152 has a thickness T measured between its outer surface 154 and inner surface 156. Although the flexible body 152 may have other thicknesses T without departing from the scope of the present invention, in one embodiment the flexible body has a generally constant throughout the body. In another embodiment, the thickness T of the flexible body 152 is greater adjacent the hole 158 than in other parts of the body.

The hole 158 may be formed in various locations of the flexible body 152 without departing from the scope of the present invention. For example, as shown in FIG. 14, the hole 158 may be formed adjacent an edge 160 of the flexible body 152. The edge 160 surrounds the flexible body 152 and, when the holder 150 includes an appendage as described above regarding other embodiments, the edge surrounds the body and the appendage. For embodiments of the holder 150 having an extra portion and/or an appendage, as described above regarding other embodiments, the hole 158 may be formed in the extra portion and/or in the appendage. The hole 158 may extend between one location of the edge 160 to another location of the edge. The item holder 150 of this embodiment is otherwise identical to holders of earlier described embodiments and therefore will not be described in further detail.

Figure 15:
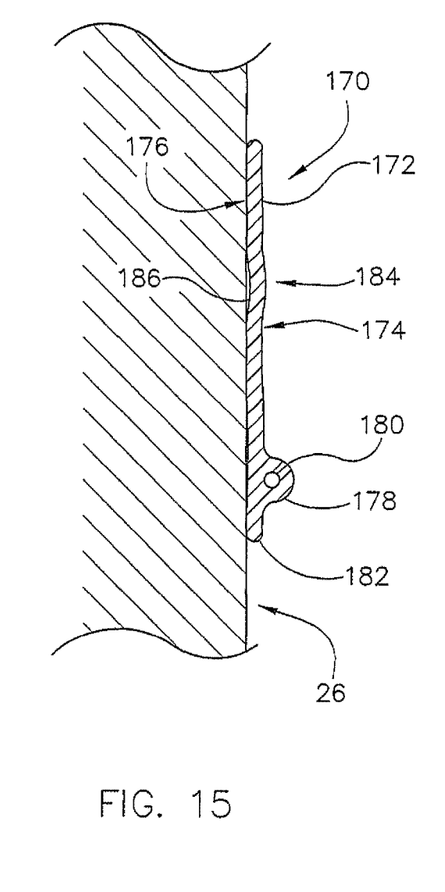
FIG. 15 is a cross section of an item holder according to a tenth embodiment of the present invention shown in an actuated shape secured to the mounting surface.

FIG. 15 shows an item holder 170 according to another embodiment of the present invention. The holder 170 according to this embodiment includes a flexible body 172 having an outer surface 174 and an inner surface 176 opposite the outer surface. The holder 170 further includes a protrusion 178 extending from the outer surface 174 of the body 172 having a hole 180 extending through it in a generally lateral direction with respect to the flexible body (i.e., generally parallel to the mounting surface during mounting of the holder 170 on the mounting surface). The hole 180 may be used for holding an item 32 (shown in FIG. 2) during use of the holder 170. The protrusion 178 may be made of various materials without departing from the scope of the present invention. For example, in one embodiment (shown in FIG. 15) the protrusion 178 is made integrally with the flexible body 172 as a part thereof and includes the same material as the rest of the body. In another embodiment (not shown), the protrusion 178 is formed separately from the flexible body 172 and then mounted on the outer surface 174 of the body. The separately formed protrusion may include the same material as the flexible body 172 or materials different from the body. The separately formed protrusion 178 may be secured to the outer surface 174 in various ways, such as by adhesion or molding.

The protrusion 178 may be positioned in various locations on the outer surface 174 of the flexible body 172 and have various sizes and shapes without departing from the scope of the present invention. For example, as shown in FIG. 15, the protrusion 178 may extend from the outer surface 174 adjacent an edge 182 of the flexible body 172. The protrusion 178 may also extend from a section 184 of the outer surface 174 that is opposite a concave portion 186 of the inner surface 176 or extend from the outer surface between that section and the edge 182. For embodiments of the holder 170 having an extra portion and/or an appendage, as described above regarding other embodiments of the present invention, the protrusion 178 may be positioned on the extra portion and/or on the appendage. The protrusion 178 may extend in the lateral direction part of the way or all of the way from one side of the body to the other side of the body. The protrusion 178 may be rounded, as shown in FIG. 15, or squared. The item holder 170 of this embodiment is otherwise identical to holders of earlier described embodiments and therefore will not be described in further detail.

Figure 16:
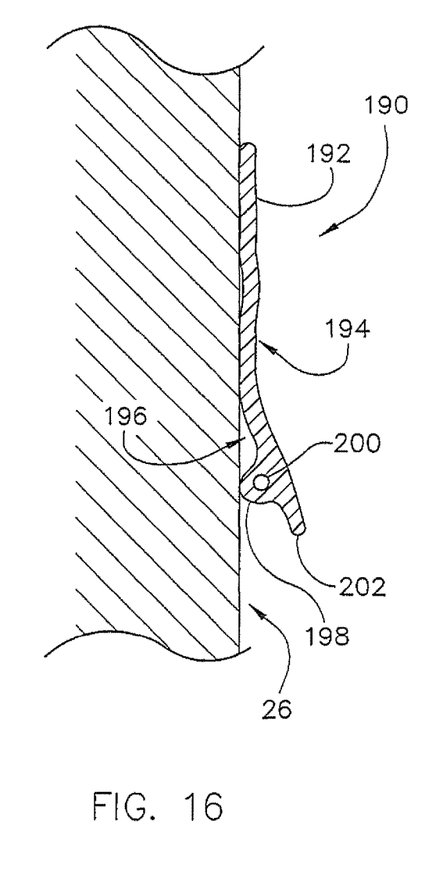
FIG. 16 is a cross section of an item holder according to an eleventh embodiment of the present invention shown in an actuated shape secured to the mounting surface.

FIG. 16 shows an item holder 190 according to another embodiment of the present invention. The holder 190 includes a flexible body 192 having an outer surface 194 and an inner surface 196. The flexible body 192 includes a protrusion 198 extending from the inner surface 196 of the body. The protrusion 198 has a hole 200 extending laterally through it for holding an item 32 (shown in FIG. 2) during use of the holder 190. The protrusion 198 may be positioned in various locations on the inner surface 196 of the flexible body 192 and have various sizes and shapes without departing from the scope of the present invention. For example, as shown in FIG. 16, the protrusion 198 may extend from the inner surface 196 adjacent an edge 202 of the flexible body 192. For embodiments of the holder 190 having an extra portion and/or an appendage, as described above regarding other embodiments, the protrusion 198 may be positioned on the extra portion and/or on the appendage. It is contemplated that the item holder 190 may include protrusions 198 extending from both the outer surface 194 and the inner surface 196 of the flexible body 192. The item holder 190 of this embodiment is otherwise identical to holders of earlier described embodiments and therefore will not be described in further detail.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An item holder, mountable by suction on a generally smooth mounting surface, comprising:
    a deformable body including:
        a convex outer surface that is substantially free of protrusions;
        a concave inner surface opposite the convex outer surface, the concave inner surface forming a concavity; and
        an edge extending around the convex outer surface and the concave inner surface of the body, wherein:
            the deformable body is shaped to form in the body an elongate void extending through the deformable body in a direction that is generally parallel to the mounting surface, and adjacent a suction portion of the body required to create mounting suction, during use of the holder;
            the elongate void formed by the deformable body terminates at opposing openings including first opening opposite a second opening;
            the deformable body is deformable from an undeformed shape to an actuated shape to mount the holder on the mounting surface by positioning the inner surface of the body adjacent the, mounting surface when the body is in the undeformed shape thereby forming a cavity between the suction portion of the body and the mounting surface and deforming the body to the actuated shape thereby sealing the body against the mounting surface and forcing fluid out of the cavity to create a suction between the body and the mounting surface thereby securing the body to the mounting surface; and
        the body defines a suction portion needed for creating the suction between the body and the mounting surface; and
    a link component extending into the first opening, through the elongate void, and out of the second opening.

2. The item holder of claim 1 wherein the elongate void has a generally tubular shape.

3. The item holder of claim 1, wherein the first opening is at a first location on the edge of the deformable body and the second opening is at a second location on the edge of the deformable body.

4. The item holder of claim 1, wherein the deformable body has a thickness measured between the outer surface and the inner surface that is greater adjacent the elongate void than at another part of the body.

5. The item holder of claim 1, wherein the deformable body has a thickness measured between the outer surface and the inner surface that is generally constant throughout the body.

6. The item holder of claim 1, wherein the link includes a material selected from a group consisting of: metal, nylon, and plastic.

7. The item holder of claim 1, wherein the link includes a chain.

8. The item holder of claim 1, wherein h link is flexible.

9. The item holder of claim 1, wherein the elongate void has a generally circular cross section.

10. The item holder of claim 1, wherein the concave inner surface includes a protrusion.

11. An item holder, mountable by suction on a generally smooth mounting surface, comprising:
a deformable body including:
a convex outer surface that is substantially free of protrusions;
a concave inner surface opposite the convex outer surface, the concave inner surface forming a concavity; and
an edge extending around the convex outer surface and the concave inner surface of the body;
wherein:
the deformable body is shaped to form in the body an elongate void extending through the deformable body in a direction that is generally parallel to the mounting surface, and adjacent a suction portion of the body required to create mounting suction, during use of the holder;
the elongate void formed by the deformable body terminates at opposing openings including a first opening opposite a second opening;
the deformable body is deformable from an undeformed shape to an actuated shape to mount the holder on the mounting surface by positioning the inner surface of the body adjacent the mounting surface when the body is in the undeformed shape thereby forming a cavity between the body and the mounting surface and deforming the body to the actuated shape thereby sealing the body against the mounting, surface and forcing fluid out of the cavity to create a suction between the body and the mounting surface thereby securing the body to the mounting surface; and
the body defines a suction portion needed for cresting the suction between the body and the mounting surface.

12. The item holder of claim 11, wherein the elongate void has generally tubular shape.

13. The item holder of claim 11, wherein the first opening is at a first location on the edge of the deformable body and the second opening is at second location on the edge of the deformable body.

14. The item holder of claim 11, wherein a thickness of the deformable body, measured between the outer surface and the inner surface, has a quality
being greater adjacent the elongate void than at another part of the body.

15. The item holder of claim 11, wherein the elongate void has a generally circular cross section.

16. The item holder of claim 11, wherein the concave inner surface includes a protrusion.

17. An item holder mountable by suction on a generally smooth mounting surface, comprising:
a deformable body including:
a convex outer surface;
a concave inner surface opposite the convex outer surface, the concave inner surface forming a concavity; and
an edge extending around the convex outer surface and the concave inner surface of the body;
wherein:
the deformable body is shaped to form in the body an elongate void extending through the deformable body in a direction that is generally parallel to the mounting surface, and adjacent a suction portion of the body required to create mounting suction, during use of the holder;
the void is not formed in a protrusion extending from the convex outer surface of the deformable body;
the elongate void formed by the deformable body terminates at opposing openings including of a first opening opposite a second opening;
the deformable body is deformable from an undeformed shape to an actuated shape to mount the holder on the mounting surface by positioning the inner surface of the body adjacent the mounting surface when the body is in the undeformed shape thereby forming a cavity between the body and the mounting surface and deforming the body to the actuated shape thereby sealing the body against the mounting surface and forcing fluid out of the cavity to create a suction between the body and the mounting surface thereby securing the body to the mounting surface;
the body defines a suction portion needed for creating the suction between the body and the mounting surface; and
the deformable body, measured between the outer surface and the inner surface, is greater adjacent the elongate void than at another part of the body.

18. The item holder of claim 17, wherein the elongate void has a generally circular cross section.

19. An item holder, mountable by suction on a generally smooth mounting surface, comprising:
a deformable body including:
a convex outer surface that is substantially free of protrusions;
a concave inner surface opposite the convex outer surface, the concave inner surface forming a concavity; and
an edge extending around the convex outer surface and the concave inner surface of the body;
wherein:
the deformable body is shaped to form in the body an elongate void extending through the deformable body adjacent a suction portion of the body required to create mounting suction during use of the holder;
the deformable body is deformable from an undeformed shape to an actuated shape to mount the holder on the mounting surface by positioning the inner surface of the body adjacent the mounting surface when the body is in the undeformed shape thereby forming a cavity between the body and the mounting surface and deforming the body to the actuated shape thereby sealing the body against the mounting surface and forcing fluid out of the cavity to create a suction between the body and the mounting surface thereby securing the body to the mounting surface; and the body defines a suction portion needed for creating the suction between the body and the mounting surface.

\* \* \* \* \*